United States Patent [19]

Kashida et al.

[11] Patent Number: 5,463,392
[45] Date of Patent: Oct. 31, 1995

[54] SIGNAL PROCESSING DEVICE

[75] Inventors: Motokazu Kashida, Musashino; Shinichi Yamashita, Yokohama, both of Japan

[73] Assignee: Canon Kabushiki Kaisha, Tokyo, Japan

[21] Appl. No.: 18,917

[22] Filed: Feb. 12, 1993

Related U.S. Application Data

[63] Continuation of Ser. No. 586,305, Sep. 21, 1990, abandoned.

[30] Foreign Application Priority Data

Sep. 27, 1989 [JP] Japan .................................. 1-251288

[51] Int. Cl.$^6$ ................................................. H03M 1/00
[52] U.S. Cl. .................................... 341/110; 364/602
[58] Field of Search ..................................... 341/155, 141, 341/110, 126; 364/602

[56] References Cited

U.S. PATENT DOCUMENTS

| | | | |
|---|---|---|---|
| 4,141,065 | 2/1979 | Sumi et al. | 364/602 X |
| 4,149,256 | 4/1979 | Sumi et al. | 341/110 X |
| 4,219,879 | 8/1980 | Judell | 341/110 X |
| 4,530,076 | 7/1985 | Dwyer | 364/574 |
| 4,933,676 | 6/1990 | Hauge et al. | 341/155 X |

*Primary Examiner*—Marc S. Hoff
*Attorney, Agent, or Firm*—Fitzpatrick, Cella, Harper & Scinto

[57] ABSTRACT

A signal processing device including a central processing block and plural signal processing function blocks, which are mutually connected by a common address bus and a common data bus, wherein analog signal lines are provided for analog signal transmission between the central processing block and the plural signal processing function blocks and the central processing block is provided with a D/A converter and an A/D converter connected to the analog signal lines. Thus there are only required a D/A converter and an A/D converter in the central processing block, for analog signal transmission between the central processing block and each of the processing function blocks. Also the wiring can be simplified as the number of analog signal lines is limited.

23 Claims, 3 Drawing Sheets

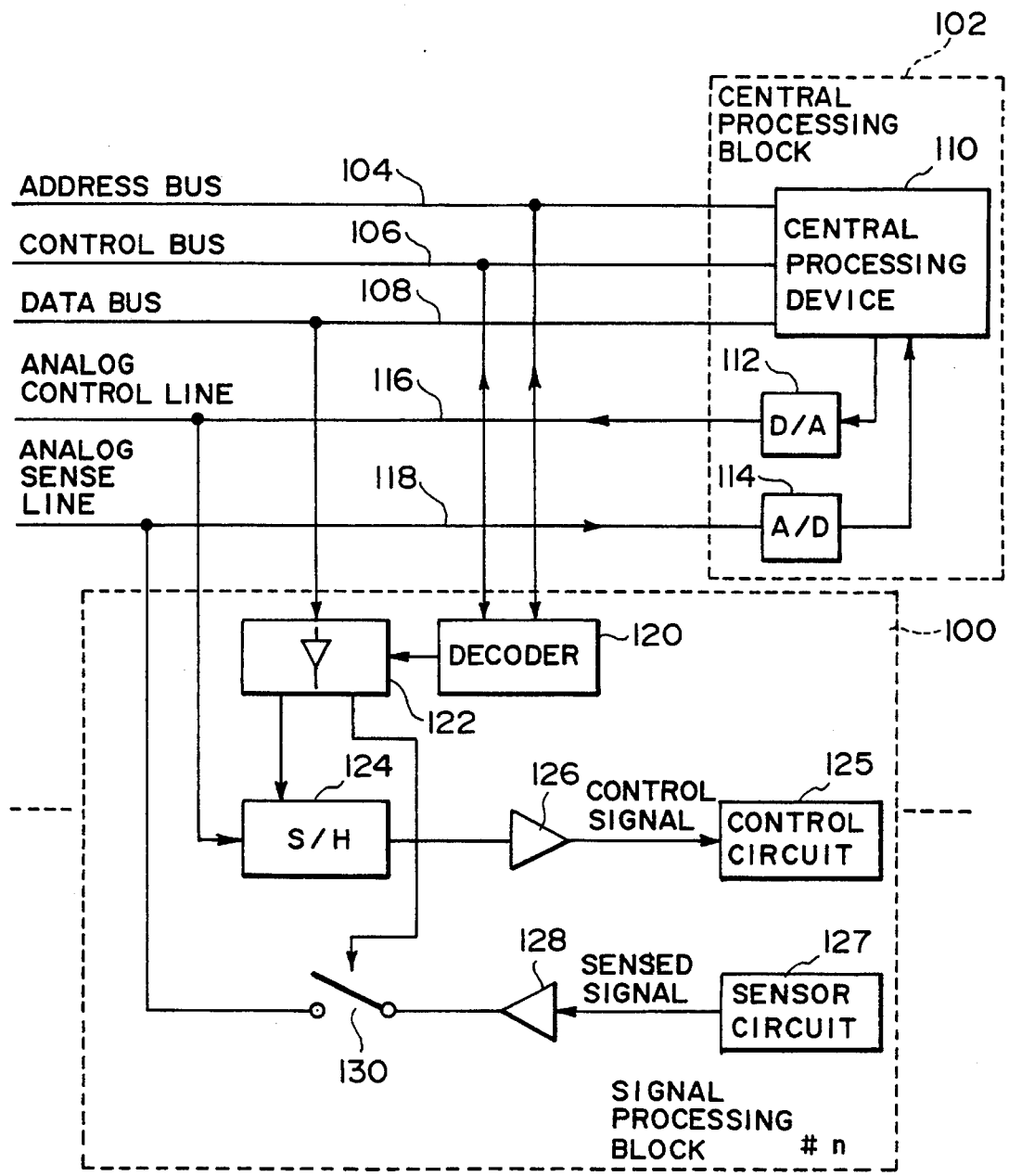
F I G. 4

5,463,392

SIGNAL PROCESSING DEVICE

This application is a continuation of application Ser. No. 07/586,305 filed Sep. 21, 1990, now abandoned.

BACKGROUND OF THE INVENTION

1. Field of the Invention

The present invention relates to a signal processing device provided with plural signal processing function blocks and a central processing block for monitoring or controlling the state of said signal processing function blocks.

2. Related Background Art

The conventional signal processing device, in which a central processing block monitors and controls the state of plural function blocks for individual signal processing, is composed, as shown in FIG. 1, of a central processing unit 10 and n function blocks 12–14 mutually connected by an address bus 16, a control bus 18 and a data bus 20, in which the control signals and sensed signals of said function blocks 12–14 are transmitted through said buses.

FIG. 2 is a block diagram of an input/output circuit, to be connected to said buses 16, 18, 20, of the function blocks 12–14 in the conventional structure shown in FIG. 1. When an address decoder 22 identifies, based on an address signal on the address bus 16 and a control signal on the control bus 18, the presence of a control signal for this block on the data bus 20, said address decoder 22 fetches said digital control signal from the data bus 20 through a bidirectional buffer 24, and activates a D/A converter 26 by a control signal 22A. In this manner there is obtained an analog control signal to be used when a control circuit 27 of each function block functions in response to an analog input. Numeral 28 indicates an analog amplifier. An analog sensed signal from an analog sensor circuit 29 is amplified by an analog amplifier 30, then digitized by an A/D converter 32 and is sent to the data bus 20 through the bidirectional buffer 24.

FIG. 3 is a block diagram showing another conventional structure, wherein a central processing unit 34 and n function blocks 36–38 are connected by an address bus 40, a control bus 42 and a data bus 44 as in FIG. 2. In the present example the function blocks 36–38 are respectively provided with analog control lines 46-1–46-n and analog sense lines 48-1 - 48-n, which are respectively selected by switches 50, 52. When the central processing unit 34 wants to send a control signal to a particular function block #k, the switch 50 is connected to the analog control line 46-k of said function block, and a digital control signal is sent to a D/A converter 54, which converts said signal into an analog signal. Said analog control line 46-k is sent through the switch 50 and the analog control line 46-k, to the function block #k. Also when the central processing unit 34 wants to receive a sensed signal from a function block #k, the switch 52 is connected to the analog sense line 48-k, whereby an analog sense signal from said block #k is supplied to an A/D converter 56 and the digitized signal is entered into the central processing unit 34.

However the conventional structure shown in FIGS. 1 and 2 requires an A/D converter and a D/A converter for each function block, thus leading to an increased magnitude of circuit and an elevated cost of manufacture.

Also the conventional structure shown in FIG. 3 requires only an A/D converter and a D/A converter in total, but requires an analog control line and an analog sense line for each function block, thus involving complication of wirings. This drawback may not be evident when a limited number of function blocks are involved, but becomes conspicuous when a large number of function blocks have to be connected.

SUMMARY OF THE INVENTION

An object of the present invention is to resolve the drawbacks explained above.

Another object of the present invention is to provide a signal processing device with simple wirings and simple circuit structure.

The foregoing objects can be attained, according to a preferred embodiment of the present invention, by a signal processing device comprising:

a central processing block;

plural signal processing blocks each having signal processing function; and analog signal lines connected commonly to said central processing block and said plural signal processing blocks.

Still other objects of the present invention, and the features thereof, will become fully apparent from the following detailed description of the embodiments of the present invention.

BRIEF DESCRIPTION OF THE DRAWINGS

FIG. 4 is a block diagram of a part of the signal processing device constituting an embodiment of the present invention.

DETAILED DESCRIPTION OF THE PREFERRED EMBODIMENTS

Figure 1:
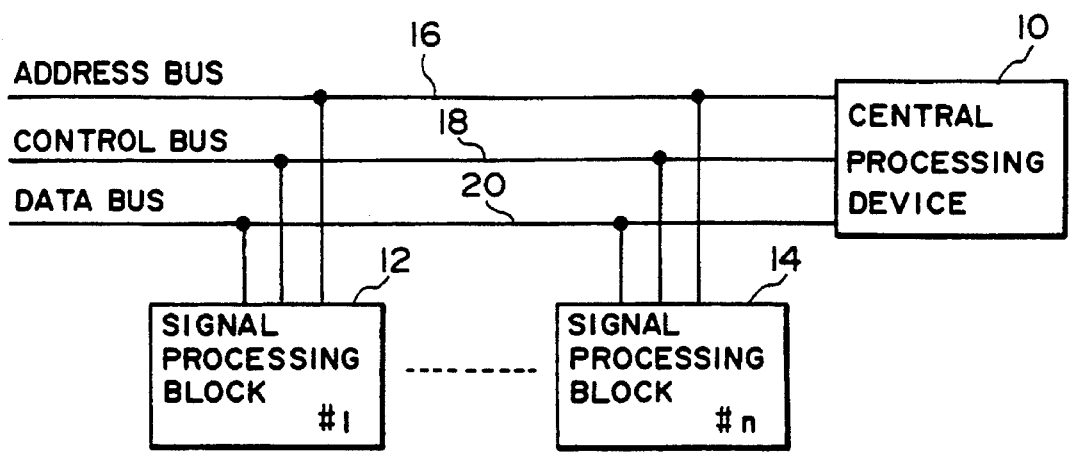
FIG. 1 is a schematic block diagram of a conventional signal processing device.
Figure 2:
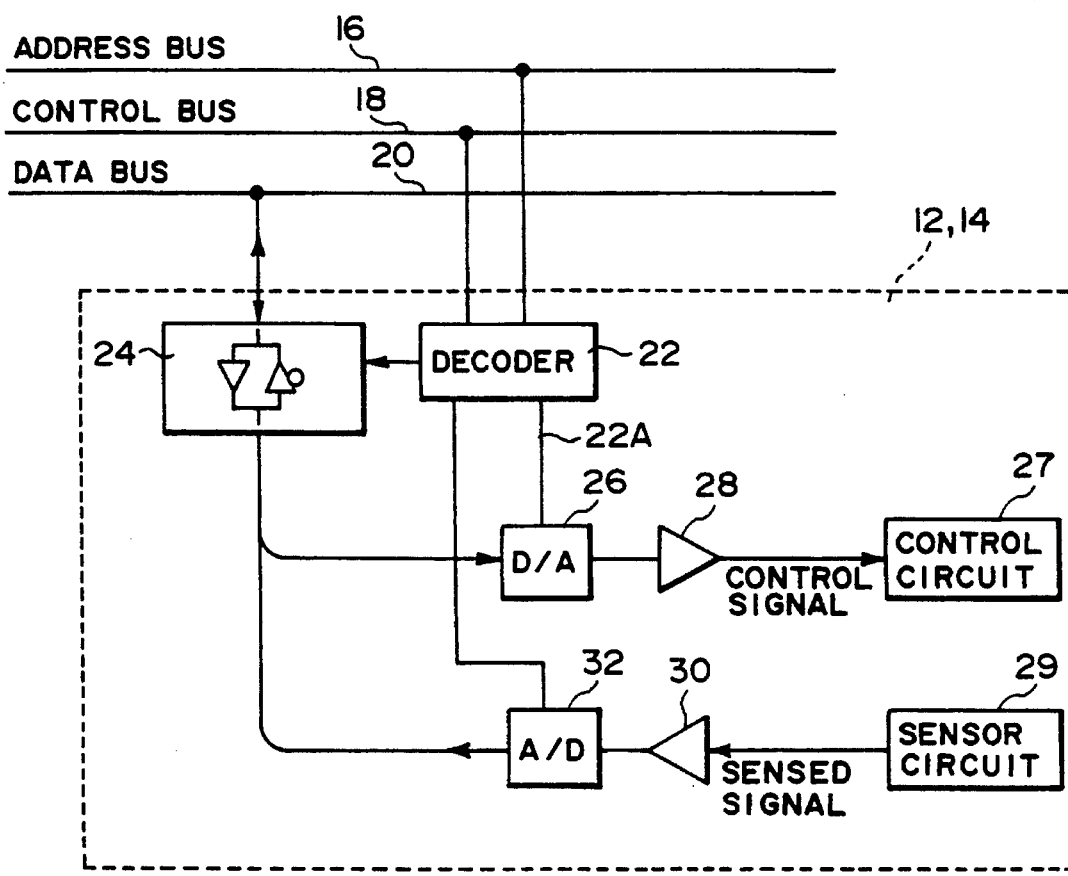
FIG. 2 is a detailed block diagram of a principal part of the device shown in FIG. 1.
Figure 3:
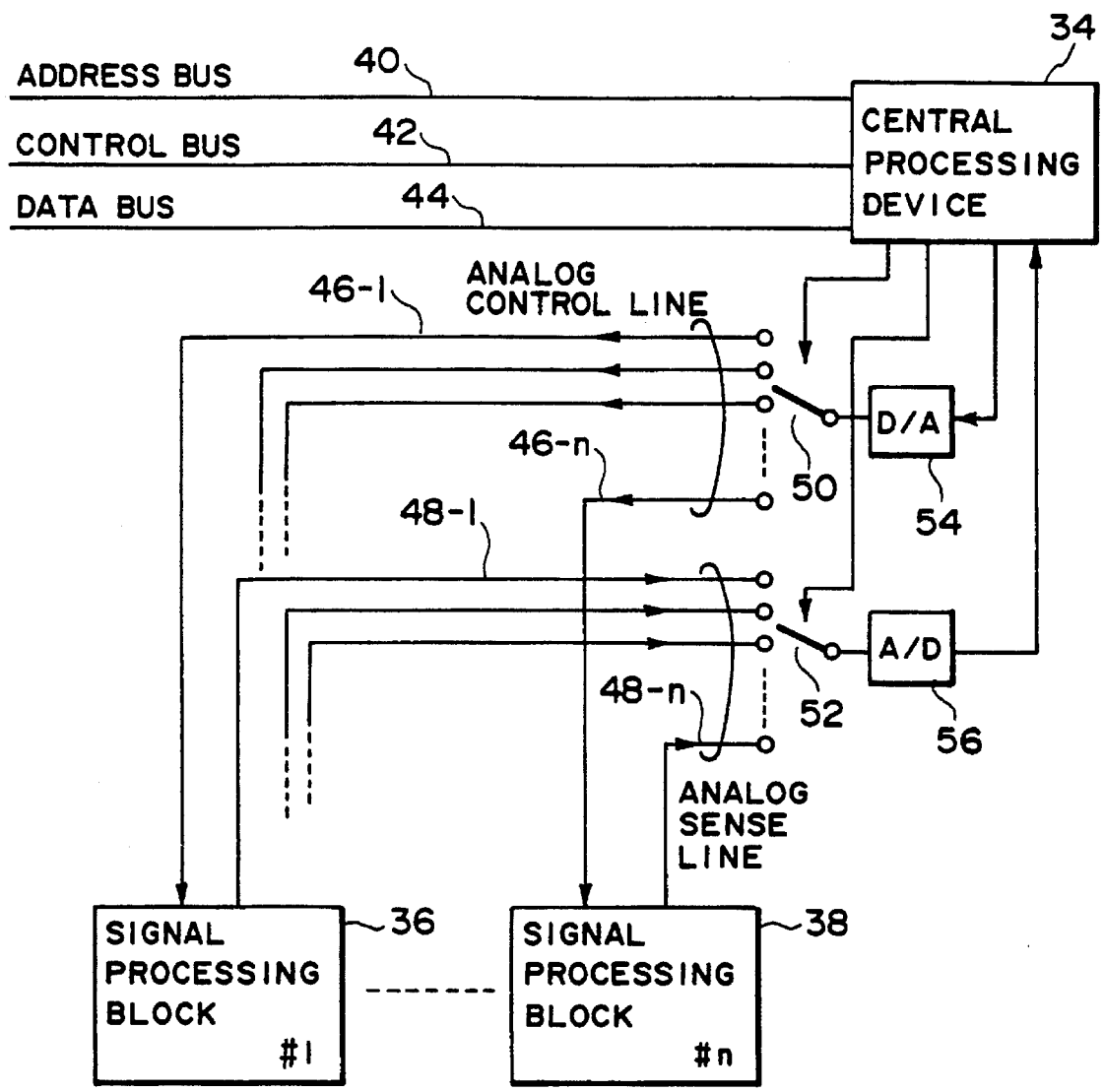
FIG. 3 is a schematic block diagram of another conventional signal processing device.

Now the present invention will be clarified in detail by an embodiment thereof shown in the attached drawings.

FIG. 4 is a block diagram of an embodiment of the present invention, wherein 100 indicates an n-th one in plural function blocks. A central processing block 102, said function block 100 and other unrepresented function blocks are mutually connected by an address bus 104, a control bus 106 and a data bus 108. The central processing block 102 is provided with a CPU 110, an A/D converter 112 and a D/A converter 114. The D/A converter 112 converts a digital control signal released from the CPU 110 into an analog control signal, which is supplied, through a common analog control line 116, to the function block 100 and all other unrepresented function blocks. Also a sensed signal from the function block 100 and all other unrepresented function blocks is supplied, through a common analog sense line 118, to the A/D converter 114, which converts said signal into a digital signal for supply to the CPU 110.

The CPU 110 receives and releases data through the D/A converter 112 and the A/D converter 114, and releases, to the address bus 104, a predetermined address as a selection signal for specifying a certain function block to which the control signal is supplied or from which the sense signal is requested. Also it releases, to the data bus 108, an output enable signal indicating the effective period of the analog signal on the analog control line 116 in case of output of a control signal, or an input enable signal indicating the period or moment of utilization of the analog sense line 118 in case of request for a sense signal.

In the following there will be explained the structure of the input/output unit of the function block 100. Naturally other unrepresented function blocks have basically the same structure. In FIG. 4, the block 100 is shown only in the input/output unit, and the signal processing part of said block is omitted. There are provided a decoder 120 connected to the address bus 104 and the control bus 106 and adapted to decode the above-mentioned selection signal released from the CPU 110; an input buffer 122 for fetching data from the data bus 108; a sample hold (S/H) circuit 124 for sample-holding of the analog control signal on the analog control line 116 in response to the output enable signal from the input buffer 122; a buffer amplifier 126 for the output of the sample-hold circuit 124; a sensor circuit 127 for generating an analog sensed signal; and a buffer amplifier 128 for the sensed signal to be transmitted from the signal processing block 100 to the central processing block 102, with the output connected to the analog sense line 118 through a normally open switch 130 which is closed by the input enable signal from the input buffer 122.

The function block 100 performs the input/output operation in the following manner. The decoder 120 decodes the data on the address bus 104 and on the control bus 106, and, upon identifying output of a control signal from the CPU 110 or request of a sense signal by the CPU 110, causes the input buffer 122 to fetch the data from the data bus 108. If the data from the data bus 108 is an output enable signal, the input buffer 122 sends it to the control terminal of the sample-hold circuit 124. If it is an input enable signal, the input buffer 122 sends it to the switch 130 thereby closing said switch.

Thus, in case of output of a control signal from the CPU 110, the sample-hold circuit 124 sample-holds the analog signal on the analog control line 116 in response to the output enable signal, and then sends it through the buffer amplifier 126 to various analog control circuits 125. Also in case of request of a sense signal by the CPU 110, the switch 130 is closed to send the output (sensed signal) of the buffer amplifier 128 to the analog sense line 118, and said signal is digitized by the A/D converter 114 and supplied to the CPU 110. In this manner the central processing block 102 can obtain the sense signal of the desired function block 100.

The present embodiment employs separate analog signal lines for the analog control signal and the analog sense signal, but there may be used an analog signal line in common. Also the selection signal and the input/output enable signals are transmitted by the digital bus, but they may be transmitted by analog signal lines or exclusive data lines for obtaining the same purpose.

As will be readily understood from the foregoing, the present invention allows to transmit an analog control signal to or receive an analog sense signal from an arbitrary one of plural function blocks, by means of a D/A converter or an A/D converter. Consequently the circuitry of each function block can be reduced. Furthermore the number of signal lines can be reduced and the wiring can be simplified, as the function blocks and the central processing block can be mutually connected by a common analog signal line.

We claim:

1. A signal processing device, comprising:

a central processing block;

plural signal processing blocks, each having a signal processing function;

analog signal lines connected in common to said central processing block and said plural signal processing blocks;

an address bus and a data bus connected in common to said central processing block and said plural signal processing blocks, wherein said analog signal line is used for supplying said plural signal processing blocks with an analog control signal released from said central processing block, and wherein said central processing block is adapted to release, together with the analog control signal, an enable signal indicating the effectiveness of the analog control signal, and wherein each of said plural signal processing blocks includes a sample-hold circuit for sampling and holding the analog control signal in response to the enable signal.

2. A signal processing device, comprising:

a central processing block;

plural signal processing blocks, each having a signal processing function; and an analog bus connected in common to said central processing block and said plural signal processing blocks, wherein said analog bus is used for supplying said central processing block with analog sensed signals output from said plural signal processing blocks, and wherein said central processing block is adapted to release a first enable signal indicating the time of utilization of the analog sensed signal, and wherein each of said plural signal processing blocks includes a gate circuit for gating the analog sensed signal in response to the first enable signal.

3. A device according to claim 2, further comprising:

a digital bus connected in common to said central processing block and said plural signal processing blocks.

4. A device according to claim 3, wherein said analog bus is used for supplying said plural signal processing blocks with an analog control signal output from said central processing block.

5. A device according to claim 4, wherein the central processing block includes a central processing device capable of generating a digital control signal, and converter means for converting said digital control signal into the analog control signal.

6. A device according to claim 4, wherein said central processing block is adapted to release, together with the analog control signal, a second enable signal indicating the effectiveness of the analog control signal.

7. A device according to claim 6, wherein said central processing block is adapted to supply the first and second enable signals to said digital bus.

8. A device according to claim 6, wherein each of said plural signal processing blocks includes a sample-hold circuit for sampling and holding the analog control signal in response to the second enable signal.

9. A device according to claim 4, wherein said central processing block is adapted to output, together with the analog control signal, a selection signal indicating a block, to which the analog control signal is to be supplied, among said plural signal processing blocks, and each of said plural signal processing blocks receiving the analog control signal in response to the selection signal.

10. A device according to claim 9, wherein said central processing block is adapted to supply the selection signal to said digital bus.

11. A device according to claim 4, wherein each of said plural signal processing blocks include control means for analog control of the function of said block according to the 12. A device according to claim 3, wherein said central processing block is adapted to supply the first enable signal to said digital bus.

13. A device according to claim 2, wherein said central processing block includes converter means for digitizing the analog sensed signal into a digital sense signal, and a central processing device functioning in response to the digital sense signal.

14. A device according to claim 3, wherein said central processing block is adapted to release a selection signal indicative of a desired block to obtain the desired analog sensed signal from said plural signal processing blocks.

15. A device according to claim 14, wherein aid central processing block is adapted to supply the selection signal to said digital bus.

16. A device according to claim 2, wherein each of said plural signal processing blocks includes a sensor circuit for generating the analog sensed signal.

17. A signal processing device, comprising:

a central processing block;

plural signal processing blocks, each having a signal processing function; and an analog bus connected in common to said central processing block and said plural signal processing blocks, wherein said analog bus is used for supplying said plural signal processing blocks with an analog control signal output from said central processing block, and wherein said central processing block is adapted to release an enable signal indicating effectiveness of the analog control signal, and wherein each of said plural signal processing blocks includes a sample-hold circuit for sampling and holding the analog control signal in response to the enable signal.

18. A device according to claim 17, further comprising a digital bus connected in common to said central processing block and said plural signal processing blocks.

19. A device according to clam 18, wherein said central processing block is adapted to supply the enable signal to said digital bus.

20. A device according to claim 17, wherein said central processing block includes a central processing device capable of generating a digital control signal, and converter means for converting the digital control signal into the analog control signal.

21. A device according to claim 17, wherein said central processing block is adapted to output a selection signal indicating a block, to which the analog control signal is to be supplied, among said plural signal processing blocks, and each of said plural signal processing blocks receiving the analog control signal in response to the selection signal.

22. A device according to claim 21, wherein said central processing block is adapted to supply the selection signal to said digital bus.

23. A device according to claim 17, wherein each of said plural signal processing blocks include control means for analog control of the function of said block according to the analog control signal.

* * * * *

UNITED STATES PATENT AND TRADEMARK OFFICE
CERTIFICATE OF CORRECTION

PATENT NO. : 5,463,392
DATED : October 31, 1995
INVENTOR(S) : MOTOKAZU KASHIDA, ET AL.

It is certified that error appears in the above-identified patent and that said Letters Patent is hereby corrected as shown below:

COLUMN 1

Line 58, "However" should read --However,--.

COLUMN 3

Line 11, "sample hold" should read --sample-hold--.
    Line 56, "Furthermore" should read --Furthermore,--.

COLUMN 4

Line 39, "the" should read --said--.
    Line 42, "said" should read --the--.

COLUMN 5

Line 14, "aid" should read --said--.

COLUMN 6

Line 9, "clam 18," should read --claim 18,--.

Signed and Sealed this

Fifth Day of March, 1996

*Attest:*

BRUCE LEHMAN

*Attesting Officer*      *Commissioner of Patents and Trademarks*